United States Patent Office 3,520,944
Patented July 21, 1970

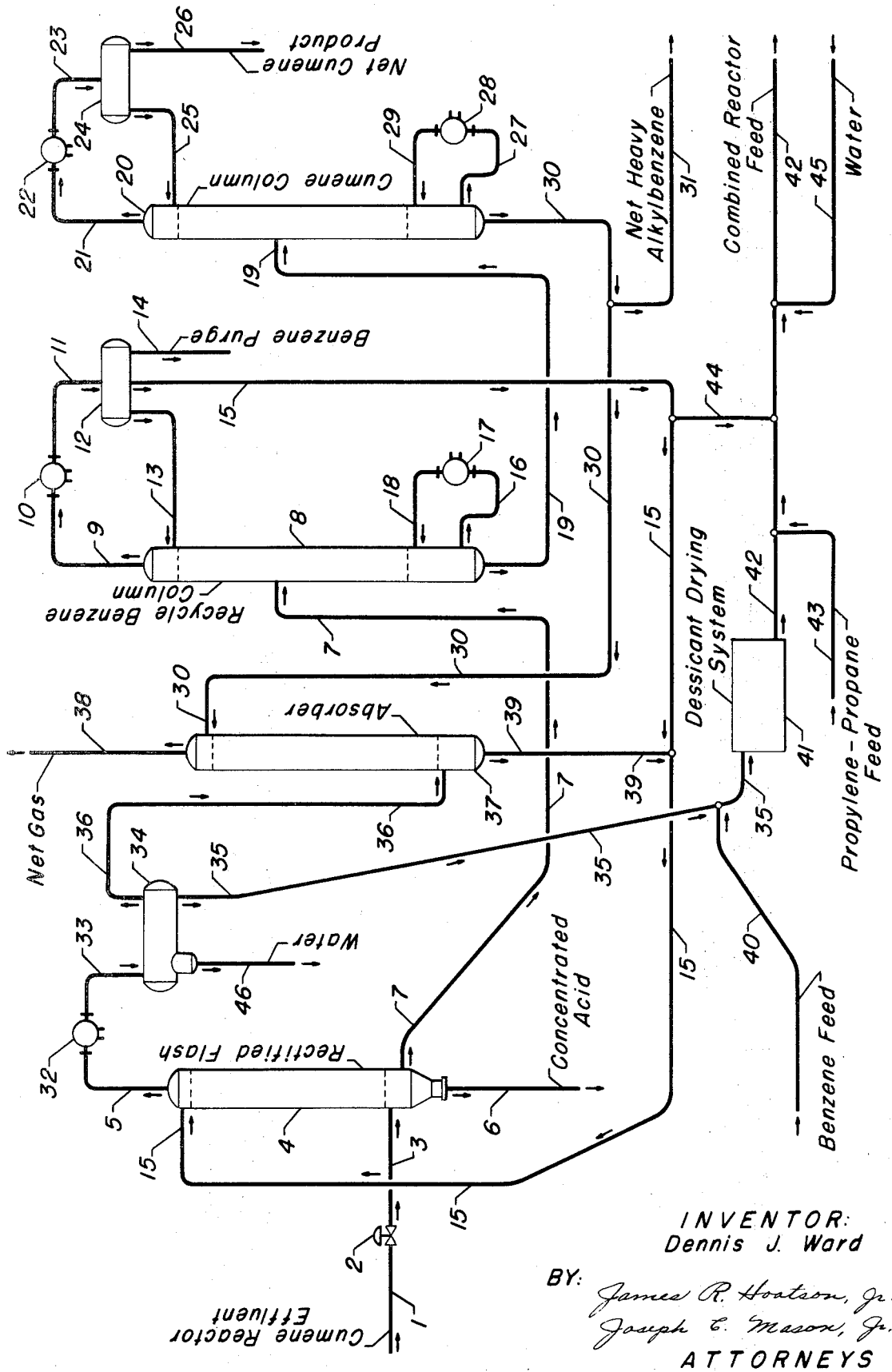

3,520,944
SEPARATION PROCESS FOR AROMATIC ALKYLATION AND OLEFINIC OLIGOMERIZATION
Dennis J. Ward, Lombard, Ill., assignor to Universal Oil Products Company, Des Plaines, Ill., a corporation of Delaware
Filed July 1, 1968, Ser. No. 741,733
Int. Cl. C07c 3/54, 3/12
U.S. Cl. 260—671                          14 Claims

ABSTRACT OF THE DISCLOSURE

Separation process for a reaction zone effluent containing at least four components, such as an aromatic alkylation reaction zone effluent. The effluent is passed into a rectified flash column having associated therewith a partial condensing zone and an absorption zone, as well as a subsequent fractionation zone. The effluent is thereby separated into unreactive diluent, alkylatable aromatic compound, alkylated aromatic product, and heavy alkylated aromatic byproduct. The process is equally effective in the separation of the effluent from an oligomerization reaction zone. Specific application of the process is in the synthesis of ethylbenzene, cumene, heptene, propylene-trimer, and propylene-tetramer.

FIELD OF INVENTION

The present invention relates to a separation process. It particularly relates to the separation of the effluent from an aromatic alkylation or an olefinic oligomerization reaction zone. Most particularly, the present invention relates to a method of separation which results in an improved process for alkylation of benzene with an ethylene-ethane mixture, for alkylation of benzene with a propylene in a propylene-propane mixture, for the oligomerization of propylene in a propylene-propane mixture, and for the co-oligomerization of propylene and butene in a reactive mixture containing propane and butane. (It is to be noted that oligomerization of olefin hydrocarbons is commonly referred to as "polymerization of olefins" in the petroleum refining industry.)

In each of the above mentioned reactions, there is produced a reaction zone effluent comprising the desired product, a diluent for return to the reaction zone, and a reactant for return to the reaction zone. Typically, the desired product may be useful chemicals including cumene, ethylbenzene, o-tertiarybutylphenol, propylene-trimer, propylene-tetramer, heptene, etc., the utility of which are well known to those skilled in the art. Thus, the present invention finds broad application in the separation of such effluent streams in a facile and economical manner.

DESCRIPTION OF THE PRIOR ART

As indicated above, the present invention particularly relates to the recovery of isopropylbenzene, or cumene, from an alkylation reaction effluent. In the commercial manufacture of cumene it is the art to charge benzene and propylene into a reactor containing a plurality of solid phosphoric acid catalyst beds.

Because it is desired to minimize the dialkylation of benzene which produces di-isopropylbenzene by-poduct, it is the art to have a molar deficiency of propylene in the reaction zone and normally this deficiency is provided by maintaining the ratio of benzene to propylene at about 8:1. The resulting alkylation effluent which leaves the reaction zone will therefore contain about seven moles of unreacted benzene per mole of product cumene, and the excess benzene must be separated from the effluent and recycled to the reaction zone in conjunction with the fresh benzene feed which is charged to the process.

The propylene reactant which is typically charged to the process will contain unreactive diluent comprising propane with traces of ethane and butane. When the propylene feed is derived from a pyrolysis plant, these diluents will normally be less than 10 mole percent, while a propylene feed derived from the gas recovery unit of a fluid catalytic cracking plant will often contain as much as 35 to 40 mole percent of unreactive diluents. In addition, to the unreactive propane diluent which is inherent in the propylene feed, it is typically the art to introduce additional propane diluent into the reaction zone to provide a thermal quench for the exothermic alkylation reaction in order that the catalyst temperature may be controlled at the desired level. This propane quench may be introduced into the reactor at elevated temperature with the propylene-propane fresh feed, or it may be introduced at elevated temperature or at ambient temperature into the reaction zone at loci between each of several catalyst beds. The alkylation effluent which leaves the typical reaction zone therefore contains a considerable amount of propane diluent.

This diluent must be separated from the effluent in order that a portion may be recycled to the reaction zone and in order that a quantity may be withdrawn from the process. The quantity withdrawn is equivalent to the quantity which is being introduced into the process in the propylene-propane feed, and it must be withdrawn from the process in order to avoid accumulation of unreactive diluents in the process unit. The quantity recycled will vary as required to maintain proper reaction temperature control. Typically, the amount of unreactive diluent required in the reaction zone will be in the range of from about five moles of diluent to one mole of olefin, to about one mole of diluent to two moles of olefin. In the synthesis of cumene the recycle diluent rate will preferably be set to control a mole ratio in the reaction zone of two moles of diluent propane to one mole of propylene.

It is the art in the manufacture of cumene to charge the alkylation effluent to a fractionation train comprising a depropanizer column, a benzene column, and a cumene column. The effluent enters the depropanizer wherein the propane diluent is removed overhead to provide the propane recycle stream for return to the reaction zone and a net propane product stream which is normally withdrawn to the fuel gas system or sent to product storage as liquefied petroleum gas (LPG). The bottoms liquid from the depropanizer passes into the benzene column which produces a benzene overhead stream. Part of the benzene produced provides the required recycle to the reaction zone and a second part is withdrawn from the process in order to avoid the accumulation of non-aromatic contaminants which enter the process as trace constituents in the benzene feed. The benzene column bottoms stream passes to a cumene column which produces an overhead comprising high purity cumene product and a bottoms of heavy alkylbenzene by-product, comprising polyalkylated benzene such as diisopropylbenzene.

The other chemical products referred to hereinabove, are synthesized in much the same manner as set forth in the production of cumene, although of course, the reactants, operating conditions, catalysts, etc. will be different. Accordingly, these other synthesis reactions need not be discussed in detail herein, except to emphasize that in each case the reaction zone effluent will contain an unreactive normally vapor diluent, unreacted or partially-reacted reactant, desired reaction product, and heavy reaction by-product. It is the separation of this type of mixture to which the present invention is particularly directed.

The use of solid phosphoric acid catalyst for aromatic alkylation and olefinic oligomerization has been known for some time, and it has been well established that this catalyst is susceptible to deterioration of both a chemical and physical nature due to an alteration of its moisture content. The loss of moisture causes deterioration of the catalyst by powdering and caking, ultimately resulting in the build-up of a high pressure drop through the catalyst bed and subsequent heat exchange equipment. On the other hand, when excessive moisture is present in the feed to the reaction zone, the catalyst softens and tends to form sludge. The sludge also causes plugging of the catalyst bed and fouling of heat exchange equipment with a resulting increase in pressure drop.

The problem of proper hydration control on the catalyst is particularly prevalent in aromatic alkylation processing.

The aromatic hydrocarbons have a pronounced tendency to leach chemically combined water off of the catalyst particles, thereby changing the balance between chemically fixed phosphoric acid and free $P_2O_5$. This loss of moisture not only results in the physical and chemical deterioration of the catalyst as noted hereinabove, but it also produces a loss of catalyst activity resulting in an increase in operating temperature levels and an increase in by-product production.

It is, therefore, typical in the art of aromatic alkylation to inject a controlled amount of water into the combined reactor feed in order to maintain catalyst hydration at an optimum operating level. Typically, the water injection rate is maintained at a rate sufficient to maintain the combined reactor feed at a moisture content in the range of from about 100 p.p.m. to 500 p.p.m. of water. In the alkylation of benzene with propylene to produce cumene, it is preferred that the water injection rate be sufficient to maintain a moisture content in the combined reactor feed of from 200 to 250 p.p.m.

Since the combined feed to the aromatic alkylation reaction zone contains moisture and there is a tendency for the feed to leach a slight amount of phosphoric acid and moisture from the catalyst, the reactor effluent will normally contain a significant amount of water. This water must be removed from the alkylatable aromatic compound before it is recycled to the reaction zone in order tthat proper hydration control in the combined feed to the reactor may be maintained. This drying is accomplished in the typical prior art cumene process by depropanizing the reactor effluent under conditions sufficient to take the moisture overhead with the propane vapor. Since the fresh benzene, which is fed to the typical cumene processing unit will contain traces of water, it is normal in the art to charge the fresh benzene to the depropanizing fractionator for drying simultaneously with the reactor effluent. Such dehydration in the depropanizing column produces a bottoms fratcion which is substantially dry. The recycle benzene which results therefrom, therefore, is returned to the reaction zone substantially free of water, thereby enabling the water injection rate in the reaction zone to be more simply set and maintained without concern for any fluctuation of moisture content in the recycle aromatic streams.

While the problem of maintaining proper catalyst hydration is most pronounced in aromatic alkylation processing, it is well known by those skilled in the art that the problem also exists in olefinic oligmerization processing. The comments made hereinabove concerning water injection into the combined reactor feed and dehydration of the reactor effluent, therefore, apply with equal force to the olefinic oligomerization process. The noted exception is that the moisture content of the combined reactor feed must be maintained at a higher level in the oligomerization process. This necessity for a higher moisture level is due to the difference in reactor operating conditions between the aromatic alkylation and olefinic oligomerization processes.

SUMMARY OF THE INVENTION

It is an object of the present invention to provide a method for the separation of a process stream containing at least four components. It is a particular object of the present invention to provide a separation process for the recovery of alkylated aromatic compounds from the effluent of an alkylation reaction zone and for the recovery of oligomerized products from the effluent of an oligomerization reaction zone. It is a specific object of this invention to produce ethylbenzene, cumene, heptene, propylene-trimer, and propylene-tetramer in a more economical and facile manner.

These and other objectives will be readily ascertained from the following description and the attached drawing which is a simplified flow diagram setting forth one specific embodiment of the invention.

The present invention is particularly directed to aromatic alkylation and olefinic oligomerization wherein the olefin is in high concentration, therefore, requiring that only a slight amount of unreacted vapor diluent be removed from the process. In essence, the present invention removes the unreactive diluent gas from the reactor effluent and from the processing unit without the use of the prior art depropanizer fractionating column.

As noted hereinabove, the present invention has a preferred application in the separation of the reactor effluent resulting from the synthesis of cumene.

According to the practice of this invention, separation of the effluent into various components is accomplished by passing the reactor effluent to a rectified flash column operated under conditions sufficient to produce a flash vapor comprising propane and benzene having substantial freedom from product cumene. The liquid portion of the reactor effluent is withdrawn from the bottom of the rectified flash column and thereafter fractionated into benzene for recycle to the fractionation zone, cumene product, and heavy alkylated aromatic by-product by typical prior art fractionation methods.

The flashed vapor is removed from the top of the rectified flash column and passed to a partial condensing zone wherein a major portion of the benzene contained in the vapor is condensed and separated into a liquid phase. In addition the partial condensing zone is operated under conditions sufficient to condense a sufficient amount of propane vapor for return to the reaction zone at the desired rate in order to provide the necessary mol ratio between propylene and propane in the reaction zone.

A net propane vapor is removed from the partial condensing zone. This propane vapor is equivalent to the amount of propane or unreacted diluent which is introduced into the cumene processing unit in the propylene-propane feed. This vent propane stream is passed from the partial condensing zone to an absorber for recovery of the substantial amount of benzene vapor which is contained therein.

The lean absorber oil which is utilized in the absorber column is the heavy alkylbenzene by-product comprising diisopropylbenzene which is separated in the typical cumene fractionation column as the bottoms fraction. The resulting rich absorber oil is sent to the rectified flash column to provide at least a part of the reflux therein. The rich absorber oil comprising the recovered benzene and the heavy alkylbenzene then passes out of the bottom of the rectified flash column with the liquid portion of the reactor effluent. The heavy alkylbenzene absorber oil, therefore, passes through the fractionation zone for recovery and recirculation to the absorber column.

The moisture in the reactor effluent passes overhead with the vapor leaving the rectified flash column. The total vapor from the flash column passes into the partial condensing zone, and the moisture condenses therein, producing an aqueous phase which separates from the condensed hydrocarbon comprising benzene and propane. The liquid benzene and propane mixture which is recycled to the reaction zone, therefore, is saturated with water.

The recycle mixture of benzene and propane is dried by passing at least a portion thereof to a drying zone. While the drying of this stream could be accomplished by fractionation, such a drying procedure would operate to defeat the economy and facility of separation which is afforded by the inventive process through the elimination of the prior art depropanizer column. Consequently, it is one embodiment of the inventive process to provide for the drying of the recycle mixture of propane and benzene by passing at least a part of this recycle stream to a dessicant drying zone.

In accordance with the foregoing disclosure, therefore, a broad embodiment of this invention may be characterized as a process for separating a reaction zone effluent containing at least four components which comprises passing the effluent from a reaction zone to a rectified flash zone maintained under separation conditions; withdrawing from the rectified flash zone a first fraction comprising a first component and a first portion of a second component, and a second fraction comprising a second portion of second component, a third component and a fourth component; passing the first fraction into a partial condensing zone maintained under partial condensing conditions; withdrawing from the partial condensing zone a third fraction comprising first component vapor and second component vapor, and a fourth fraction comprising second component; contacting the third fraction in an absorption zone maintained under absorption conditions with a lean absorbent hereinafter specified; withdrawing from the absorption zone first component vapor substantially free from second component, and rich absorbent containing second component; passing the second fraction into a separation zone maintained under separation conditions; withdrawing from the separation zone a fifth fraction comprising second component, a sixth fraction comprising third component, and a seventh fraction comprising fourth component; passing a part of the seventh fraction to the absorption zone as the specified lean absorbent; and, recovering the sixth fraction.

A preferred embodiment of the present invention may be characterized by this separation process wherein the reaction zone comprises an alkylation reaction zone, the first component comprises an unreactive diluent, the second component comprises an alkylatable aromatic compound, the third component comprises a first alkylated aromatic compound, and the fourth component comprises a second alkylated aromatic compound having a molecular weight greater than the molecular weight of the first alkylated aromatic compound.

A further preferred embodiment of the present invention may be characterized by this separation process wherein the reaction zone comprises an oligomerization reaction zone, the first component comprises an unreactive diluent, the second component comprises partially-oligomerized product, the third component comprises oligomerized product, and the fourth component comprises oligomerized by-product having a molecular weight greater than the molecular weight of the oligomerized product.

In a more specific embodiment of the inventive process, as defined in the three broad components above, at least a part of the second component is returned to the reaction zone and at least a portion of the part returned is desiccant dried before entering the reaction zone.

A clear understanding of the present invention may now be readily obtained by referring to the accompanying drawing which sets forth a simplified flow for carrying out one specific example wherein the process of the present invention is practice.

DRAWING AND EXAMPLE

As previously noted, a particularly preferred embodiment of this invention comprises the inventive process wherein the alkylatable aromatic compound is benzene, the olefinic alkylating agent is propylene, the unreacted diluent is propane, and the desired mono-alkylated compound is high purity cumene. Referring now to the drawing, propylene reacts with benzene over a solid phosphoric acid catalyst in a reaction zone, not shown, under alkylation reaction conditions sufficient to produce cumene.

The resulting cumene reactor effluent enters the inventive separation process via line 1 at a rate of 3368.3 mols/hr., a temperature of 460° F., and at a pressure of 500 p.s.i.g. (As used herein, the term "mols per hour" refers to pound mols per hour.) The reactor effluent comprising propane, unreacted benzene, cumene product, and heavy alkylbenzene by-product (typically comprising diisopropylbenzene), passes through a back pressure control valve 2 and enters a rectified flash column 4 via line 3 wherein it is flashed at a pressure of 245 p.s.i.g. and at a flash temperature of 410° F. The effluent enters the rectified flash column 4 at a lower locus below suitable fractionation trays which provide a rectification zone within the column. The hot vapor portion of the flashed effluent passes up through the rectification zone and is processed in a manner which will be disclosed hereinafter.

The hot liquid portion of the effluent drops to the bottom of the rectified flash column 4 and is separated therein into two phases. An aqueous phase containing concentrated phosphoric acid is withdrawn via line 6 and is sent to a disposal system, not shown. This stream normally consists of about one gallon per day of aqueous concentrated phosphoric acid and comprises the typical phosphoric acid solution which is leached off of the catalyst in the alkylation reaction zone. The major portion of the bottoms liquid is a hydrocarbon phase comprising benzene and alkylated benzene compounds, and it is withdrawn from the bottom section of rectified flash column 4 via line 7 at a temperature of 390 F. and at a pressure of 245 p.s.i.g.

The hydrocarbon liquid withdrawn from the bottom of rectified flash column 4 passes through a pressure reduction valve, not shown, and enters recycle benzene column 8 at a temperature of 245° F. and a pressure of 17 p.s.i.g. This feed hydrocarbon stream enters column 8 at a rate of 1975.3 mols/hr. The recycle benzene column 8 is operated under conditions sufficient to separate benzene from the alkylated benzene products which were produced in the reaction zone. An overhead vapor comprising benzene and traces of propane is withdrawn via line 9 at a rate of 3470.4 mols/hr. The overhead vapor stream enters condenser 10 at a temperature of 225° F. and at a pressure of 15 p.s.i.g., wherein it is cooled to 100° F. before passing into receiver 12 via line 11.

The benzene liquid, which is accumulated in receiver 12 is separated into three portions. A first portion is withdrawn via line 13 at a rate of 1797.2 mols/hr. and is introduced into the top of recycle benzene column 8 as reflux. A second portion of liquid benzene is withdrawn via line 14 as a benzene purge stream and sent to a subsequent recovery means, not shown, at a rate of 5.2 mols/hr. The withdrawal of benzene purge stream via line 14 is necessary in order to avoid the accumulation of unreactive hydrocarbon constituents which enter the alkylation process as trace contaminants of the fresh benzene feed. These contaminants must be withdrawn from the system in this manner to avoid their accumulation within the alkylation processing unit.

A third portion of the benzene liquid is withdrawn from receiver 12 via line 15 at a rate of 1668.0 mols/hr. This portion of benzene liquid is subsequently separated to provide a recycle benzene fraction for return to the alkylation reaction zone via line 44 at a rate of 1023.0 mols/hr. This recycle benzene stream will be discussed hereinafter. A second part of the liquid benzene in line 15 is passed to the rectified flash column 4 via line 15 at a rate of 645.0 mols/hr. in a manner which will be set forth hereinafter.

Recycle benzene column 8 is provided with a typical reboiler circuit as a heat input source at the bottom of the column. A portion of the liquid hydrocarbon which accumulates in the bottom of column 8 is withdrawn therefrom via line 16 at a temperature of 375° F. and is introduced into reboiler 17. A portion of the hydrocarbon is vaporized therein and the reboiled hydrocarbon stream is returned to column 8 via line 18 at a temperature of 375° F.

A net liquid hydrocarbon comprising alkylbenzene is withdrawn from recycle benzene column 8 via line 19 and is passed to cumene column 20 at a rate of 302.1 mols/hr., at a temperature of 375° F., and at a pressure of 8 p.s.i.g. Cumene column 20 is operated under conditions sufficient to separate high purity cumene product from heavier alkylbenzene by-products. A high purity cumene vapor is withdrawn from the top of column 20 via line 21 at a rate of 782.8 mols/hr. This vapor enters condenser 22 via line 21 at a temperature of 325° F., and a pressure of 5 p.s.i.g. wherein it is condensed and cooled to 280° F. before passing into receiver 24 via line 23. A portion of the condensed cumene liquid is withdrawn from receiver 24 via line 25 at a rate of 500.4 mols/hr. and is returned to the top of column 20 as reflux. A net cumene product is withdrawn from receiver 24 via line 26 at a rate of 282.4 mols/hr. and upon subsequent cooling, is sent to high purity cumene product storage facilities.

Cumene column 20 is provided with a typical reboiler circuit for provision of heat input within the column. A portion of the liquid hydrocarbon, which accumulates at the bottom of cumene column 20, is withdrawn therefrom via line 27 at a temperature of 440° F. This liquid is introduced into reboiler 28 wherein a portion is vaporized before returning to column 20 via line 29 at a temperature of 440° F.

A heavy alkylbenzene product is withdrawn from cumene column 20 via line 30 at a rate of 19.7 mols/hr. and at at temperature of 440° F. The heavy alkylbenzene stream comprises diisopropylbenzene and other heavy constituents. A net byproduct fraction is withdrawn from line 30 via line 31 at a rate of 9.7 mols/hr. This net heavy alkylbenzene by-product stream is subsequently cooled and sent to by-product storage, not shown. The remaining portion of the heavy alkylbenzene withdrawn from cumene column 20, is passed via line 30 at a rate of 10 mols/hr. to a heat exchanger means, not shown, wherein it is cooled from 440° F. to 100° F. before passing to absorber column 37 for further processing in a manner to be disclosed hereinafter.

Returning now to the operation of rectified flash column 4, as the effluent vapors pass up through the rectification zone within the column, they are contacted by refluxing liquid in order to provide that virtually no alkylated benzene compounds will leave the top of column 4 with the vapor. A final vapor is withdrawn from column 4 via line 5 at a rate of 2053.0 mols/hr. This vapor enters condenser 32 at a temperature of 385° F. and a pressure of 245 p.s.i.g. The vapor is partially condensed therein and cooled to 100° F. before passing into receiver 34 via line 33 at a pressure of 240 p.s.i.g. A hydrocarbon liquid fraction is withdrawn from receiver 34 via line 35 at a rate of 2043.0 mols/hr. and returned to the alkylation reaction zone in a manner which will be discussed hereinafter.

A vapor fraction is withdrawn from receiver 34 via line 36 at a rate of 10.0 mols/hr. and a temperature of 100° F. This vapor comprises propane and vaporized benzene hydrocarbon and is introduced into the bottom of absorber column 37 at a pressure of 125 p.s.i.g. The vapor passes up through column 37 wherein it is contacted by a lean absorbent liquid in order to remove substantially all benzene from the vapor phase. Lean absorbent liquid comprising heavy alkylbenzene, which was withdrawn from cumene column 20, is introduced into the top of absorber column 37 via line 30 at a rate of 10.0 mols/hr. and at a temperature of 100° F. A net propane vapor is withdrawn from the top of absorber 37 via line 38 at a rate of 5.0 mols/hr., and at a temperature of 100° F. This net gas comprises propane and other normally vapor hydrocarbons and has substantial freedom from benzene vapor. The net gas is passed into a recovery system at a pressure of 100 p.s.i.g., and it may be sent to LPG recovery or to a fuel gas header.

A rich absorber oil is withdrawn from the bottom of absorber column 37 via line 39 at a rate of 15.0 mols/hr. and a temperature of 115° F. This rich absorber oil comprises heavy alkylbenzene absorbent (predominantly diisopropylbenzene) absorbed benzene liquid, and absorbed propane vapor. The rich absorbent enters line 15 wherein it is combined with the recycle benzene which was noted hereinabove. The 645.0 mols/hr. recycle benzene combined with 15.0 mols/hr. of rich absorbent flows in line 15 at a rate of 660.0 mols/hr. and is introduced into the top of rectified flash column 4 via line 15 as reflux.

The liquid which accumulates in receiver 34 is separated therein into a hydrocarbon phase and an aqueous phase. The aqueous phase is derived from moisture which was injected into the aromatic alkylation reaction zone in order to maintain proper catalyst hydration. The aqueous phase settles to the bottom of receiver 34 and is withdrawn via line 46 and sent to a disposal system, not shown. The hydrocarbon phase within receiver 34 comprises benzene and propane and is saturated with moisture. The hydrocarbon is withdrawn from receiver 34 via line 35 for return to the reaction zone in order to provide a portion of the necessary recycle benzene and a portion of the necessary propane diluent.

Because of its saturation with moisture, the hydrocarbon in line 35 is too wet to be introduced directly into the alkylation reaction zone. Consequently, provision must be made for drying this stream. In addition, the benzene feed which must be fed to the reaction zone contains traces of moisture which must be removed therefrom. In the prior art processing systems, the drying is provided in the prior art depropanizer column. The benzene, both fresh and recycle, is a bottoms product of the depropanizer column and, therefore, is substantially free of moisture. In the inventive process, however, it will be seen that the recycle stream contained in line 35 has not been stripped of water in the manner which is normally provided by the typical prior art depropanizer column.

Consequently, the recycle hydrocarbon comprising benzene and propane which passes in line 35 at a rate of 2043.0 mols/hr. must be combined with the fresh benzene feed for dehydration. The fresh benzene feed is introduced into line 35 via line 40 at a rate of 297.0 mols/hr. to produce a combined wet hydrocarbon stream comprising 2340.0 mols/hr. of benzene and propane. The wet hydrocarbon then is passed, at least in part, to a desiccant drying system 41. Desiccant drying system 41 may be provided with any suitable desiccant such as silica gel, activated alumina, molecular sieves, etc., and it may comprise any of many well known prior art processing systems.

A resulting dry hydrocarbon stream is withdrawn from desiccant drying system 41 via line 42 at a rate of 2340.0 mols/hr. This hydrocarbon stream has substantial freedom from moisture. The propylene-propane feed for the alkylation process is introduced into line 42 via line 43 at a rate of 309.6 mols/hr. The propylene feed stream contains 5.0 mols/hr. of diluent vapor comprising propane, and this stream has substantial freedom from moisture. In addition, a recycle benzene fraction is introduced via line 44 into line 42. The recycle benzene fraction was produced as an overhead product from recycle benzene column 8 as previously noted hereinabove, and this stream is also substantially dry and normally will not be processed through the desiccant drying system 41.

As is well known by those skilled in the art, the combined reactor feed which is passed to the alkylation reaction zone will typically contain from 200 to 250 p.p.m. of water. Consequently, water is injected into line 42 via line 45 at a rate sufficient to provide that from 200 to 250 p.p.m. of water will be contained in the combined reactor feed. The final wet hydrocarbon mixture is passed to the alkylation reaction zone, not shown, at a rate of 3672.6 mols/hr. via line 42. The combined reactor feed comprises propane, propylene, and benzene and it contains from 200 to 250 p.p.m. of water. The combined reactor feed is passed over a solid phosphoric acid catalyst in the reaction zone to produce the cumene reactor effluent, which enters the inventive process via line 1 in the manner set forth hereinabove.

PREFERRED EMBODIMENTS

Several important advantages of the inventive process may be readily ascertained from the foregoing process description.

The first advantage which will be readily seen is that the depropanizer column of the typical prior art process is eliminated by utilization of the rectified flash column 4, the partial condensing zone comprising condenser 32 and receiver 34, and the absorber column 37. Whereas, the total reactor effluent would be charged to the depropanizer under the practices of the prior art and would be fractionated therein, in the present invention, about one-third of the benzene and all of the alkylbenzene of the effluent is passed directly to the recycle benzene column via line 6 without prior distillation. The rectified flash column 4 therefore is a much shorter column having a significantly smaller diameter than the prior art depropanizer column. In addition, since the propane which is recycled to the reaction zone from receiver 34 is admixed with benzene recycle, it will be seen that it is not produced as a high purity depropanizer overhead fraction. Therefore, the partial condensing system comprising condenser 32 and receiver 34 can be significantly reduced in size over the condensing system utilized in the prior art depropanizer column since the high reflux of the depropanizer column has been eliminated. In addition, it will be seen that by utilizing the sensible heat of the reactor effluent, the reboiler system of the prior art depropanizer column has been eliminated. Although an absorber column 37 has been added to the separation process, this column is an extremely small piece of equipment since only a very small amount of propane vapor must be contacted with lean absorbent. The net result is that the present invention can yield a considerable saving in capital cost over the prior art distillation systems containing a depropanizer column and this saving is particularly pronounced in large size processing units.

There is also a reduction of operating cost for the cumene plant due to the reaction and elimination of utilities which are required at the typical prior art depropanizer column. Since the sensible heat of the reactor effluent provides the energy required within the rectified flash column 4 and the present invention has eliminated the reboiler system of the prior art depropanizer column, the heat required heretofore to reboil the depropanizer bottoms liquid has been eliminated. In addition, there is a savings in the cost of cooling within the partial condenser 32 in comparison to the cooling which is required in the overhead condenser of the prior art depropanizer column. This saving in cooling cost occurs because the recycle propane is withdrawn from receiver 34 in admixture with recycle benzene and it is not produced as a pure overhead product from the depropanizer column. If the propane recycle were a pure overhead product from the prior art depropanizer column, it would require that it be benzene free since the net propane vapor produced simultaneously from the overhead system of the depropanizer column must be benzene free for use as fuel gas or LPG. The propane recycle may be allowed to contain considerable amounts of benzene, however, since it is also necessary to recycle benzene to the alkylation reactor. Since the recycle propane is an overhead product of the prior art depropanizer column, it is forced to meet the purity specification of the net product propane, thus adding reflux and condensing utility expense with no beneficial result to the process. The present invention eliminates this wasteful utility cost.

There are similar savings in the capital cost and utility expenses to be realized at the recycle benzene column. In the present invention, about two-thirds of the benzene recycle is returned to the alkylation reactor from receiver 34 and only about one-third of the benzene recycle is charged to the recycle benzene column 8 via line 6. This results in a reduced loading at the recycle benzene column, for not only is the feed reduced but the amount of reflux is reduced accordingly. Thus, the column diameter, overhead condensing system, reboiler system, and other auxiliary equipment may be significantly reduced in size due to the reduced column loading. Not only is capital cost reduced for this equipment but utility expense for operating the benzene column is also reduced.

Other advantages in addition to those set forth hereinabove, will be apparent to those skilled in the art.

While the embodiment set forth has been specific to the manufacture of cumene by the inventive process, it must be realized that the present invention is also applicable to the manufacture of other alkylated aromatic hydrocarbons such as ethylbenzene. The inventive process may also be found to be effective in the separation of the effluent from the synthesis of other alkylated aromatic compounds, such as alkylphenols, in the presence of an unreactive normally vapor diluent.

It will be noted that the rectified flash zone was maintained at 410° F. and 245 p.s.i.g. in the example given but that these conditions are specific to the example. The conditions of reflux rate, temperature, and pressure may be adjusted to give the desired separation between liquid and vapor in the effluent. Preferably, these conditions will provide that about half to two-thirds of the benzene in the reactor effluent will flash into the vapor phase, and that about half to one-third will remain in the liquid phase. However, the liquid-vapor split may be shifted up or down as desired by choice of the operating conditions, provided that substantially all of the unreactive propane diluent is in the vapor phase and that substantially all of the alkylated benzene remains in the liquid phase. Thus, it is within the scope of the present invention that the rectified flash vapor in line 5 will contain substantially all of the unreactive propane vapor diluent and that it may contain from about 10% to about 90% of the unreacted benzene, while the flash liquid in line 7 may correspondingly contain from about 90% to about 10% of the benzene and substantially all of the alkylated benzene.

The primary control of the separation of the effluent into liquid and vapor is the amount of pressure drop to which the effluent is subjected upon leaving the reaction zone and entering the flash zone comprising rectified flash column 4. As noted above, it is preferable that the pressure drop, or flashing, should provide that about half to two-thirds of the benzene is in the vapor phase and half to one-third is in the liquid phase. Although the alkylation reaction may occur at pressures in excess of 1000 p.s.i.g., little or no flashing of vapor would occur at such pressure, and since the cost of fabricating the vessel for the flash zone would be excessive at such a pressure level, it is advantageous to keep the pressure level at about 500 p.s.i.g. or below.

Since the rectified vapor leaving rectified flash column 4 must enter the partial condensing zone in order to provide the liquid recycle and the net vapor which is subsequently passed to the absorber column, it is important not to operate the rectified flash zone and partial condensing zone at a pressure which is below the pressure of the subsequent absorber column 37. Thus, while the rectified flash column 4 and receiver 34 could be maintained at a pressure in the range of from about 50 pounds to 200 pounds, this pressure level could conceivably be below the pressure of the absorber column 37 thus requiring that the vapor from the partial condensing zone be pumped into the absorber column. Consequently, the rectified flash column and partial condensing zone should at all times be maintained at a pressure above the pressure maintained in absorber column 37.

In addition, it is preferable that the pressure not only be sufficiently high to transfer the vapor into the absorber column 37 without mechanical assistance, but it is also preferable that the pressure be maintained as high as possible in order to minimize the utility expense required to pump the liquid recycle of line 35 into the high pressure reaction zone. Thus, it is preferable that rectified flash column 4 be maintained at a pressure of from about 200 p.s.i.g. to 500 p.s.i.g. and more specifically that the pressure be maintained at from 200 p.s.i.g. to 300 p.s.i.g. when applied to cumene production.

As noted hereinabove, the pressure within the partial condensing zone comprising condenser 32 and receiver 34 should be sufficient to allow the net uncondensed vapor to pass into the absorber without compression. In addition, the temperature and pressure within the partial condensing zone should be established at a level which is sufficient to provide that a minimum amount of benzene vapor will be contained in the total vapor composition passing into absorber 37. Since the partial condensing zone is in direct and open communication with the rectified flash column 4, the pressure within this zone will typically be at the same pressure level as the pressure within rectified flash column 4. Thus, the pressure will normally be from 200 p.s.i.g. to 500 p.s.i.g. and preferably, this pressure will be from 200 p.s.i.g. to 300 p.s.i.g. on a cumene processing operation.

The temperature within the partial condensing zone will preferably be as cool as possible in order to condense the maximum amount of benzene vapor, and in order to condense substantially all of the propane which is necessary for recycle to the reactor. Typically, this temperature will be in the range of 60° F. to 100° F. and normally this temperature will be in the range of from 80° F. to 100° F.

The operating conditions of temperature, pressure, and lean absorbent flow rate which were indicated for absorber 37 are specific to the example given. Normally, it is desired to maintain the temperature as cool as possible in order to achieve minimum absorption of the benzene vapor into the lean absorbent comprising heavy alkylbenzene. Typically, the temperature will be in the range of from 60° F. to 150° F. and normally, absorber 37 will be maintained at a pressure of 100 p.s.i.g. or greater in order to maximize absorption efficiency. Those skilled in the art can readily establish necessary operating conditions within absorber 37 for any specific application of the inventive process.

It will be noted that the fractionation section of the example comprises a recycle benzene column and a cumene column. The operating conditions within these fractionation columns are specific for the process set forth in the example and the operating conditions which may be necessary for any other reactor effluent composition will be readily ascertainable by those skilled in the art. It is not, therefore, necessary within the description of this invention to discuss broad operating ranges which are required for such fractionation columns.

The conditions of temperature and pressure within the desiccant drying zone of the present inventive process also need not be defined with great detail. Any pressure sufficient to maintain the mixture of benzene and propane in the liquid phase will be sufficient. Although desiccant drying could be undertaken in the vapor phase, the necessary equipment would be greatly increased in size, and, therefore, it is preferable that the drying be done in the liquid phase for economic considerations. Typical temperatures which will be required within the desiccant drying zone will be from 60° F. to 150° F., and normally the desiccant drying zone will operate in the range of from 80° F. to 100° F. The dessicant drying system may comprise any well known prior art processing flow and may employ any normally solid desiccant. Since desiccant drying systems are well known by those skilled in the art, it is not necessary to further describe this segment of the inventive process.

The specific operating conditions which may be required within the inventive separation process for any specific reactor effluent composition, are readily ascertainable by those skilled in the art utilizing the teachings which have been presented in the paragraphs hereinabove.

It should be noted that in the example set forth, a solid phosphoric acid catalyst was used in the reaction zone for alkylation of the aromatic hydrocarbon. Since aromatic hydrocarbons leach water and phosphoric acid from the catalyst, provision must be made for removal of concentrated phosphoric acid as indicated via line 6. Where other catalyst systems are used in the inventive process, such provision for acid removal from the bottom of rectified flash column 4 may not be necessary.

It should also be noted that in the example set forth, the rich absorbent was sent to the rectified flash column 4 via lines 39 and 15, but it should be realized that the inventive process is not so limited. Thus, it is within the scope of the present invention to send the rich absorbent to recycle benzene column 8 for separation of the recovered benzene from the heavy alkylbenzene absorbent. It is preferred, however, to send the rich absorbent to the rectified flash column 4, in order to minimize the presence of propane in the recycle benzene column, and thereby keep the operating pressure at a minimum therein.

It will be readily seen that the inventive process, as set forth in the drawing and example above, wherein cumene is recovered from an aromatic alkylation reactor effluent, is equally applicable to the separation of an effluent from an oligomerization reactor. Those skilled in the art will perceive that partially oligomerized product will be returned to the reaction zone via line 35 and via line 44 for further reaction with fresh feed olefin to produce the desired fully oligomerized product. In addition, the unreactive diluent which is necessary for the maintenance of the mole ratio of unreactive diluent to olefin, and which is necessary to provide the thermal quench in the reaction zone, will be recovered in admixture with partially oligomerized product and returned to the reaction zone via line 35. Those skilled in the art will also recognize that partially oligomerized product will be recovered from the vented diluent gas in absorber 37 by utilizing heavy oligomerized by-product as the lean absorbent introduced via line 30. The benefits which accrue to the cumene process by utilization of the inventive separation process will, therefore, be equally realized when applying the present invention to the synthesis of commercial heptene fractions, propylene-trimer and propylene-tetramer.

From the foregoing discussion, it may now be summarized that a particularly preferred embodiment of the present invention is to process for recovery of alkylated aromatic compounds which comprises: passing an alkylation effluent, comprising unreactive diluent, alkylatable aromatic compound, first alkylated aromatic compound, and second alkylated aromatic compound having a molecular weight greater than the molecular weight of the first alkylated aromatic compound, from an alkylation reaction zone into a rectified flash zone maintained at a pressure in the range of from about 200 p.s.i.g. to about 500 p.s.i.g. and at a temperature in the range of from about 250° F. to about 500° F.; withdrawing from the rectified flash zone a first fraction comprising diluent and a first part of the alkylatable aromatic compound, and withdrawing therefrom a second fraction comprising a second part of the alkylatable aromatic compound, first alkylated aromatic compound, and second alkylated aromatic compound; passing the first fraction into a partial condensing zone maintained at a pressure in the range of from about 200 p.s.i.g. to about 500 p.s.i.g. and at a temperature in the range of from about 250° F. to about 500° F.; withdrawing from the partial condensing zone a third fraction comprising diluent vapor and alkylatable aromatic compound vapor, and a fourth fraction comprising alkylatable aromatic compound liquid; contacting the third fraction in an absorption zone maintained under absorption conditions with a lean absorbent hereinafter specified; withdrawing from the absorption zone, diluent vapor substantailly free from alkylatable aromatic compound; passing the second fraction into a separation zone maintained under separation conditions; withdrawing from the separation zone a fifth fraction comprising alkylatable aromatic compound, a sixth fraction comprising first alkylated aromatic compound, and a seventh fraction comprising second alkylated aromatic compound; passing a part of the seventh fraction to the absorption zone as the specified lean absorbent; and recovering the sixth fraction.

The invention claimed:

1. Process for separating a reaction zone effluent containing at least four components which comprises:
   (a) passing said effluent fro ma reaction zone to a rectified flash zone maintained under separation conditions;
   (b) withdrawing from said rectified flash zone a first fraction comprising a first component and a first portion of a second component, and withdrawing therefrom a second fraction comprising a second portion of said component, a third component and a fourth component;
   (c) passing said first fraction into a partial condensing zone maintained under partial condensing conditions;
   (d) withdrawing from said partial condensing zone a third fraction comprising first component vapor and second component vapor, and a fourth fraction comprising second component;
   (e) contacting said third fraction in an absorption zone maintained under absorption conditions with a lean absorbent hereinafter specified;
   (f) withdrawing from said absorption zone first component vapor substantially free from second component, and rich absorbent containing second component;
   (g) passing said second fraction into a separation zone maintained under separation conditions;
   (h) withdrawing from said separation zone a fifth fraction comprising second component, a sixth fraction comprising third component, and a seventh fraction comprising fourth component;
   (i) passing a part of said seventh fraction to said absorption zone a said specified lean absorbent; and,
   (j) recovering said sixth fraction.

2. Process of claim 1 wherein said rich absorbent is passed into said rectified flash zone.

3. Process of claim 1 wherein said rich absorbent is passed into said separation zone.

4. Process of claim 1 wherein at least a part of said second component is passed into said reaction zone by the recycle of one of the group consisting of at least a part of said fourth fraction, at least a part of said fifth fraction, and a mixture comprising at least a part of said fourth fraction and at least a part of said fifth fraction.

5. Process of claim 4 wherein at least a portion of said part of second component is desiccant dried before entering the reaction zone.

6. Process of claim 1 wherein said reaction zone comprises an alkylation reaction zone, said first component comprises an unreactive diluent, said second component comprises an alkylatable aromatic compound, said third component comprises a first alkylated aromatic compound, said fourth component comprises a second alkylated aromatic compound having a molecular weight greater than the molecular weight of said first alkylated aromatic compound.

7. Process of claim 1 wherein said reaction zone comprises an oligomerization reaction zone, said first component comprises an unreactive diluent, said second component comprises partially-oligomerized product, said third component comprises oligomerized product, and said fourth component comprises oligomerized by-product having a molecular weight greater than the molecular weight of said oligomerized product.

8. Process for recovery of alkylated aromatic compounds which comprises:
   (a) passing an alkylation effluent, comprising unreactive diluent, alkylatable aromatic compound, first alkylated aromatic compound, and second alkylated aromatic compound having a molecular weight greater than the molecular weight of said first alkylated aromatic compound, from an alkylation reaction zone into a rectified flash zone maintained at a pressure in the range of from about 200 p.s.i.g. to about 500 p.s.i.g. and at a temperature in the range of from about 250° F. to about 500° F.;
   (b) withdrawing from said rectified flash zone a first fraction comprising diluent and a first part of said alkylatable aromatic compound, and withdrawing therefrom a second fraction comprising a second part of said alkylatable aromatic compound, first alkylated aromatic compound, and second alkylated aromatic compound;
   (c) passing said first fraction into a partial condensing zone maintained at a pressure in the range of from about 200 p.s.i.g. to about 500 p.s.i.g. and at a temperature sufficient to condense a portion of said first part of alkylatable aromatic compound;
   (d) withdrawing from said partial condensing zone a third fraction comprising diluent vapor and alkylatable aromatic compound vapor, and a fourth fraction comprising alkylatable aromatic compound liquid;
   (e) contacting said third fraction in an absorption zone maintained under absorption conditions with a lean absorbent hereinafter specified;
   (f) withdrawing from said absorption zone diluent vapor substantially free from alkylatable aromatic compound, and rich absorbent containing alkylatable aromatic compound;
   (g) passing said second fraction into a separation zone maintained under separation conditions;
   (h) withdrawing from said separation zone a fifth fraction comprising alkylatable aromatic compound, a sixth fraction comprising first alkylated aromatic compound, and a seventh fraction comprising second alklated aromatic compound;
   (i) passing a part of said seventh fraction to said absorption zone as said specified lean absorbent; and,
   (j) recovering said sixth fraction.

9. Process of claim 8 wherein said rich absorbent is passed into said rectified flash zone.

10. Process of claim 8 wherein said rich absorbent is passed into said separation zone.

11. Process of claim 8 wherein said alkylatable aromatic compound comprises benzene, said diluent comprises ethane, and said alkylated aromatic compound comprises ethylbenzene.

12. Process of claim 8 wherein said alkylatable aromatic compound comprises benzene, said diluent comprises propane, and said alkylated aromatic compound comprises cumene.

13. Process of claim 8 wherein at least a part of said alkylatable aromatic compound is passed into said reaction zone by the recycle of one of the group consisting of at least a part of said fourth fraction, at least a part of said fifth fraction, and a mixture comprising at least a part of said fourth fraction and at least a part of said fifth fraction.

14. Process of claim 13 wherein at least a portion of said part of alkylatable aromatic compound is desiccant dried before entering the reaction zone.

References Cited

UNITED STATES PATENTS

| | | | |
|---|---|---|---|
| 3,437,705 | 4/1969 | Jones | 260—671 |
| 3,437,706 | 4/1969 | Gantt et al. | 260—671 |
| 3,437,707 | 4/1969 | Sulzbach | 260—671 |
| 3,437,708 | 4/1969 | Gantt | 260—671 |

DELBERT E. GANTZ, Primary Examiner

C. R. DAVIS, Assistant Examiner

U.S. Cl. X.R.

260—674; 683.15